Dec. 11, 1934.  F. D. LEWIS  1,983,701
APPARATUS FOR RECOVERING GOLD AND OTHER PRECIOUS
METALS FROM MILLED ORES AND PLACER MATERIAL
Filed May 16, 1933  6 Sheets-Sheet 1

Inventor:
Frank D. Lewis
By G. Sarquit Elliott
Attorney.

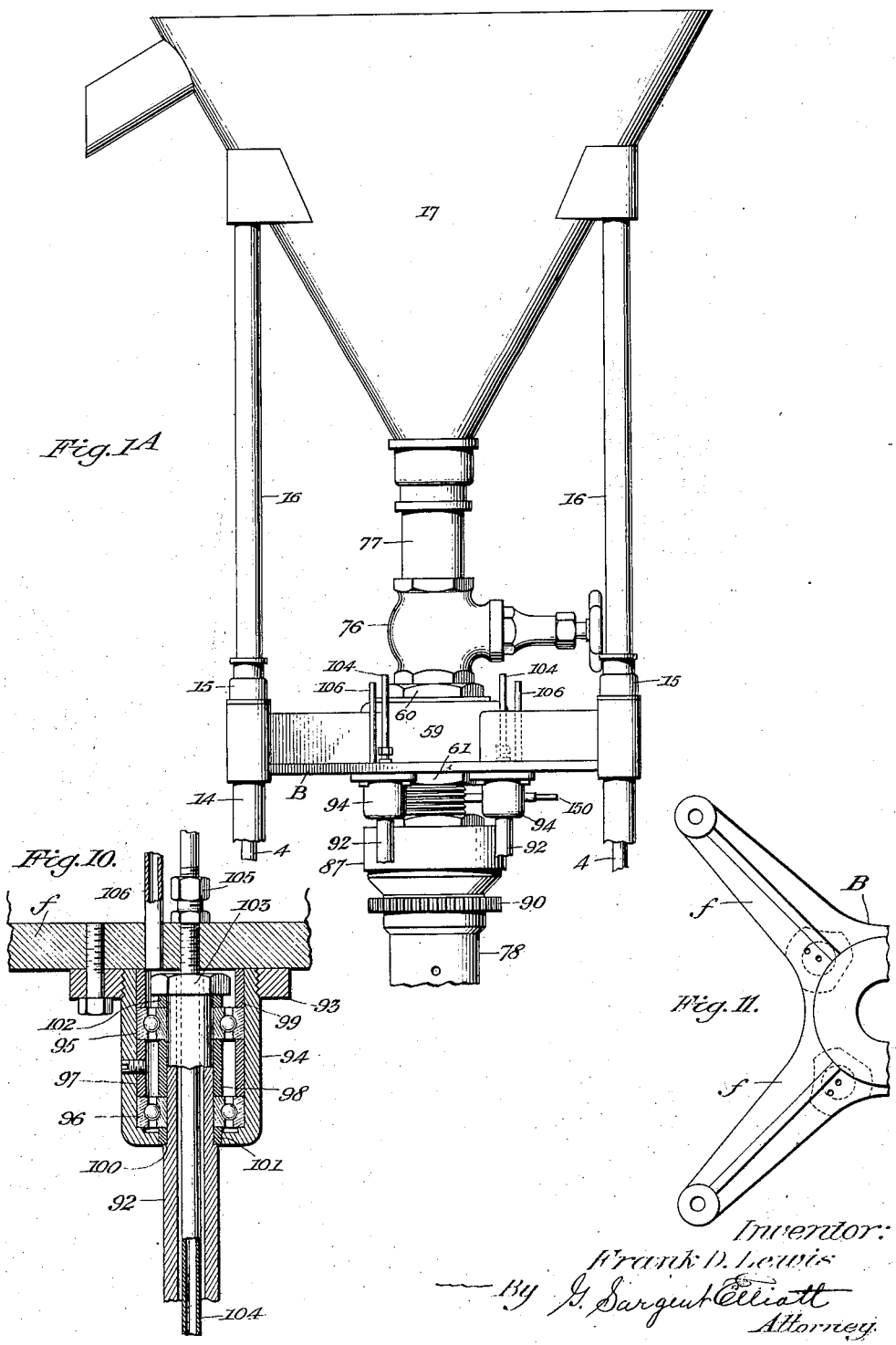

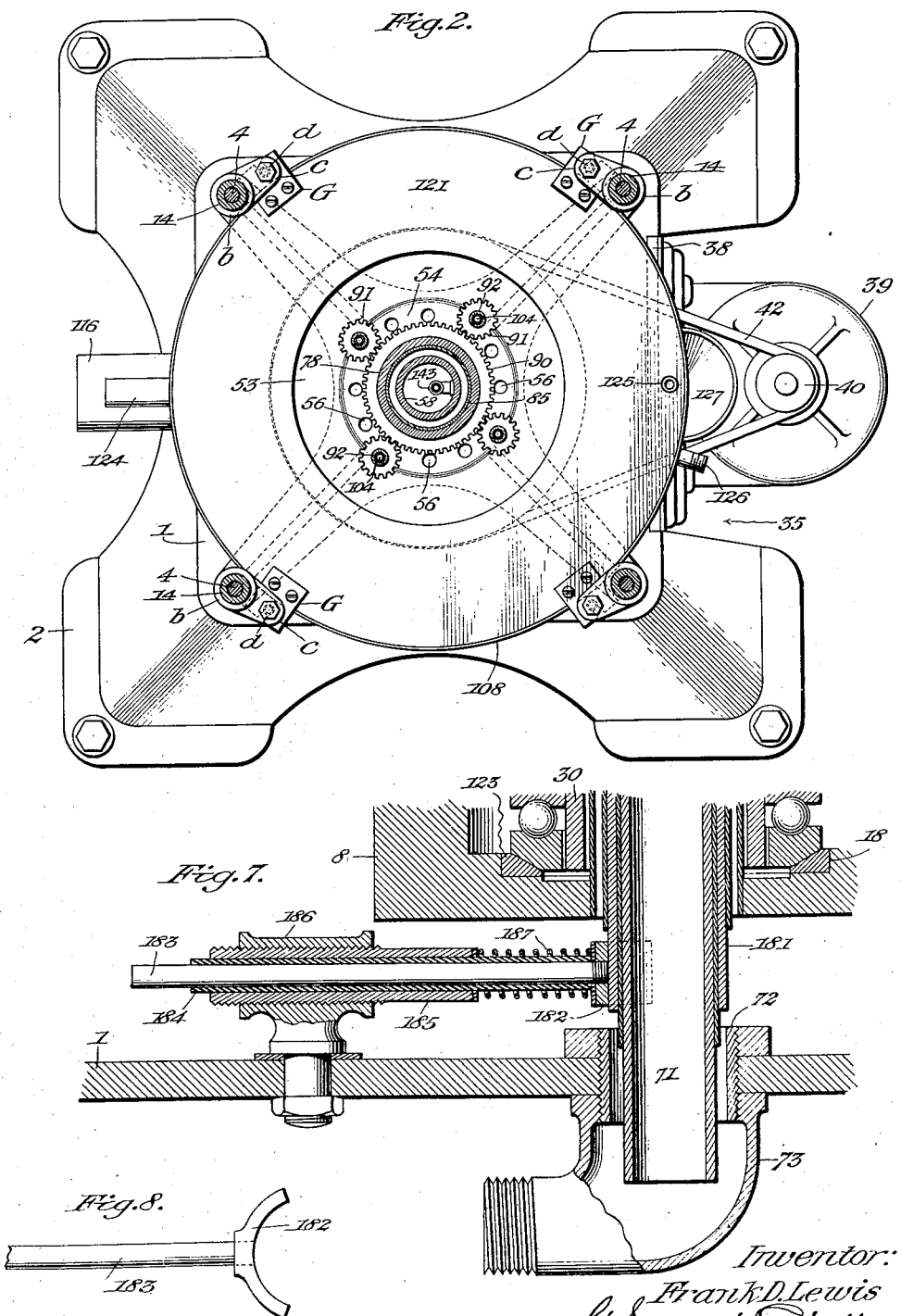

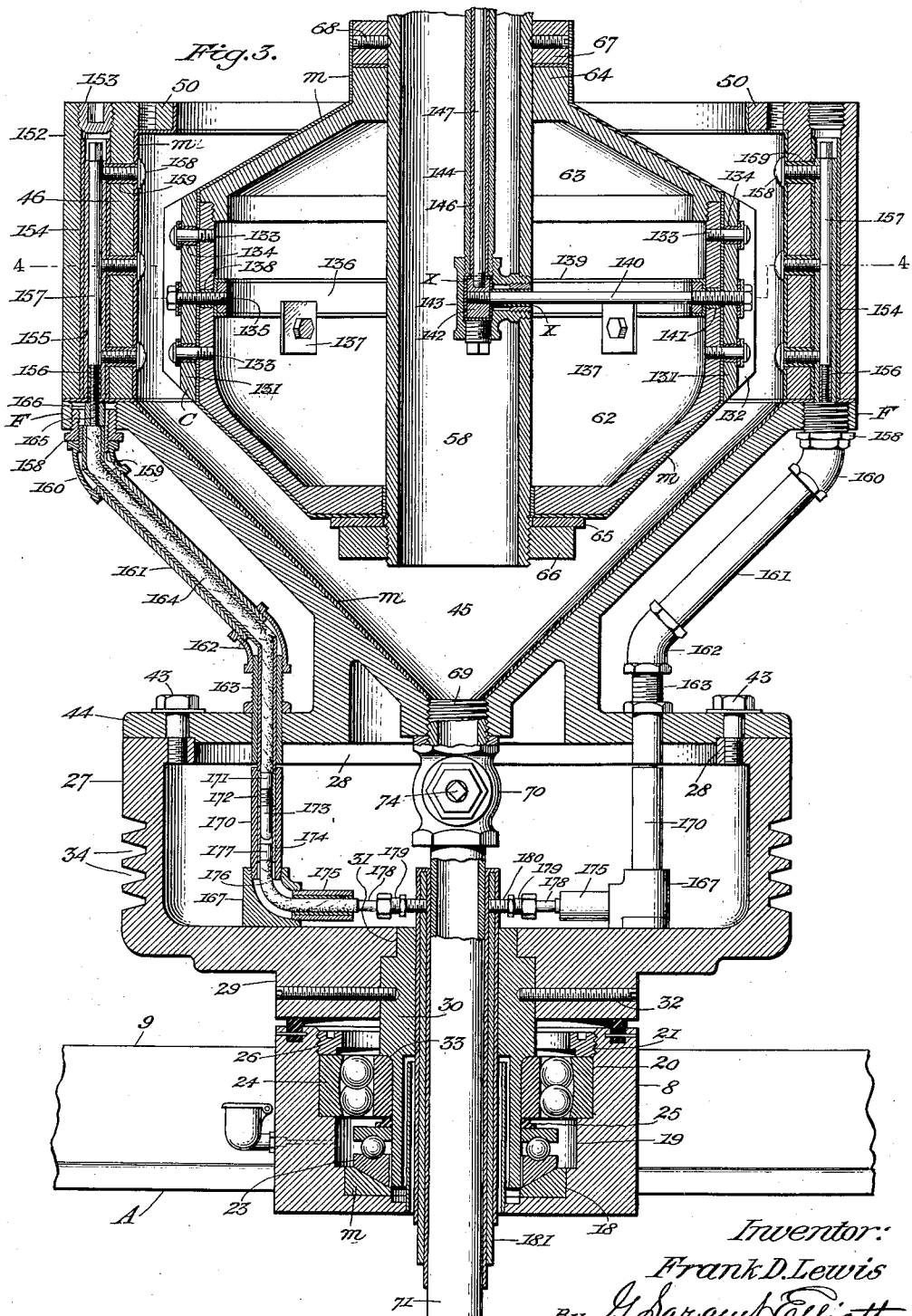

Dec. 11, 1934.  F. D. LEWIS  1,983,701
APPARATUS FOR RECOVERING GOLD AND OTHER PRECIOUS
METALS FROM MILLED ORES AND PLACER MATERIAL
Filed May 16, 1933  6 Sheets-Sheet 5

Inventor:
Frank D. Lewis,
By G. Sarqui Elliott
Attorney

Dec. 11, 1934.                   F. D. LEWIS                   1,983,701
          APPARATUS FOR RECOVERING GOLD AND OTHER PRECIOUS
             METALS FROM MILLED ORES AND PLACER MATERIAL
                      Filed May 16, 1933          6 Sheets-Sheet 6
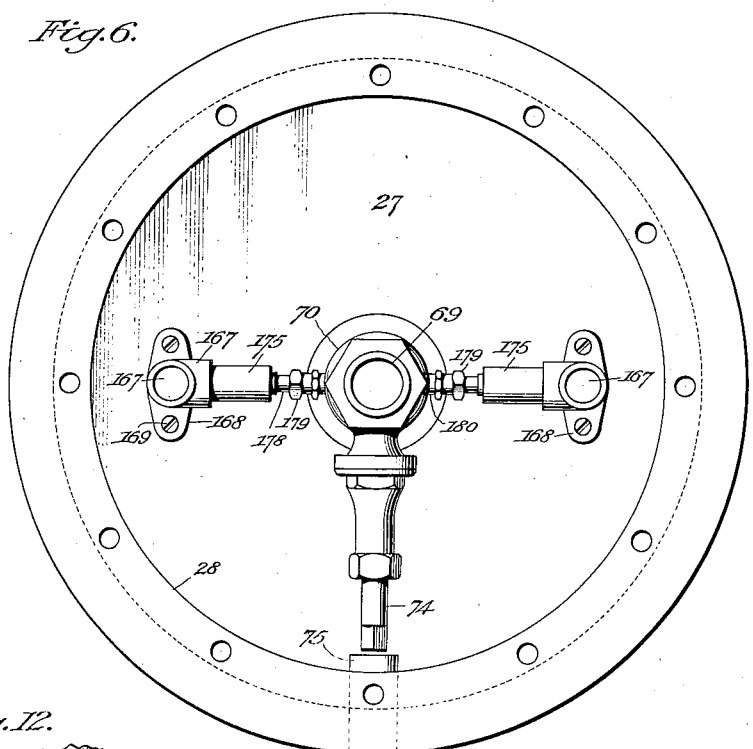
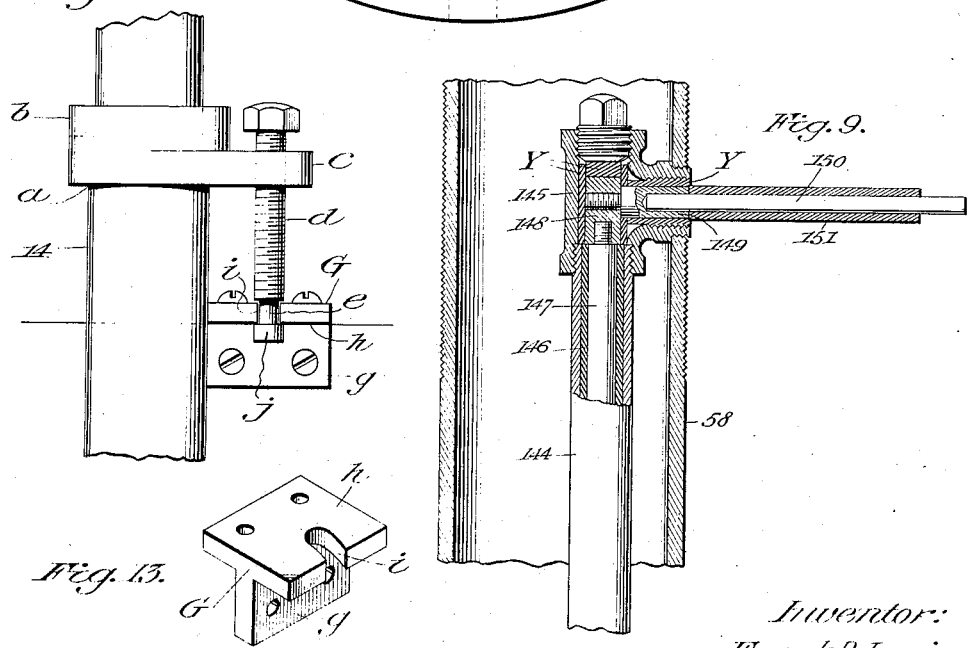
Inventor:
Frank D. Lewis
By G. Sargent Elliott
Attorney.

Patented Dec. 11, 1934

1,983,701

UNITED STATES PATENT OFFICE 1,983,701

APPARATUS FOR RECOVERING GOLD AND OTHER PRECIOUS METALS FROM MILLED ORES AND PLACER MATERIAL

Frank D. Lewis, Denver, Colo.

Application May 16, 1933, Serial No. 671,300

16 Claims. (Cl. 209—199)

My invention relates to an apparatus for recovering gold and other precious metals from milled ores and from placer gravels and sands, by means of a combination of amalgamation, concentration and flotation treatments.

And the objects of my invention are:

To provide a system and apparatus for recovering gold and other minerals from milled ores and placer by amalgamation, by concentration, and by flotation simultaneously and in the order named as they are fed into and through the apparatus.

Further, to provide an apparatus for recovering values from milled ores or placer material, by amalgamation, by concentration, and by flotation simultaneously, and under centrifugal action, and in which the recovery of values by flotation is facilitated by the agitation of the sludge, and the introduction therein of air, and a re-agent, after the amalgamation treatment, thereby forming an emulsion, the mercury in the amalgamation treatment being activated by an electric current.

Further, to provide an apparatus that will concentrate and recover all gold bearing particles of ores or placer gravels and sands that are coated with rust or acid or oil or any other material that prevents them from amalgamating with mercury and especially that will concentrate every and all kinds of fine particles of pyritical and other sulphides that occur in complex sulphide ores.

Further, to provide an apparatus that will recover from milled ores and placer gravels and sands a very large element of exceedingly fine, and almost colloidal types of ground ores that under present amalgamating and concentrating methods do not yield a satisfactory percentage of their values.

These objects are accomplished in the manner illustrated in the accompanying drawings, in which:

Fig. 1A is a detached side view of the feed hopper and regulating valve connected therewith, the supporting spider therefor, and other parts connected to the under side of said spider.

Fig. 2 is a horizontal sectional view on the line 2—2 of Fig. 1.

Fig. 3 is an enlarged vertical sectional view through the rotatable amalgamating and concentrating receptacle, the hollow belt-driven cylinder secured thereto, the stationary baffle-supporting element within the said receptacle, the feed pipe extending through the same, and the electrical current conveying means supported by these members, together with the lower ball bearing support.

Fig. 6 is a top plan view of the hollow belt cylinder, showing the valved outlet for the amalgam, and the current conductor supports which are secured therein.

Fig. 7 is a fragmental sectional view through the lower end of the apparatus, showing the arrangement of the negative electric current terminal and the conductor associated therewith and surrounding but insulated from the amalgam outlet pipe.

Fig. 8 is a top view of the terminal contact brush.

Fig. 9 is a vertical sectional view through the upper portion of the feed pipe, showing the arrangement of the positive electric terminal and conductor associated therewith which are supported in the said pipe.

Fig. 10 is a vertical sectional view through the upper portion of one of the agitator tubes and its ball bearing support which is secured to the upper spider of the supporting frame, also showing tubes for supplying air and a re-agent to the material under treatment.

Fig. 11 is a top plan view of a portion of the upper spider of the supporting frame showing the positions of the ball bearing supports for the agitator tubes and the holes in which the pipes for air and a re-agent are secured.

Fig. 12 is an enlarged elevation of the adjusting means for raising or lowering the telescoping top portion of the launder, to regulate the tailings discharge.

Fig. 13 is a perspective view of the member shown in Fig. 12, which is secured to the telescoping portion of the launder and is engaged by the adjusting screw.

Figures 1, 14:
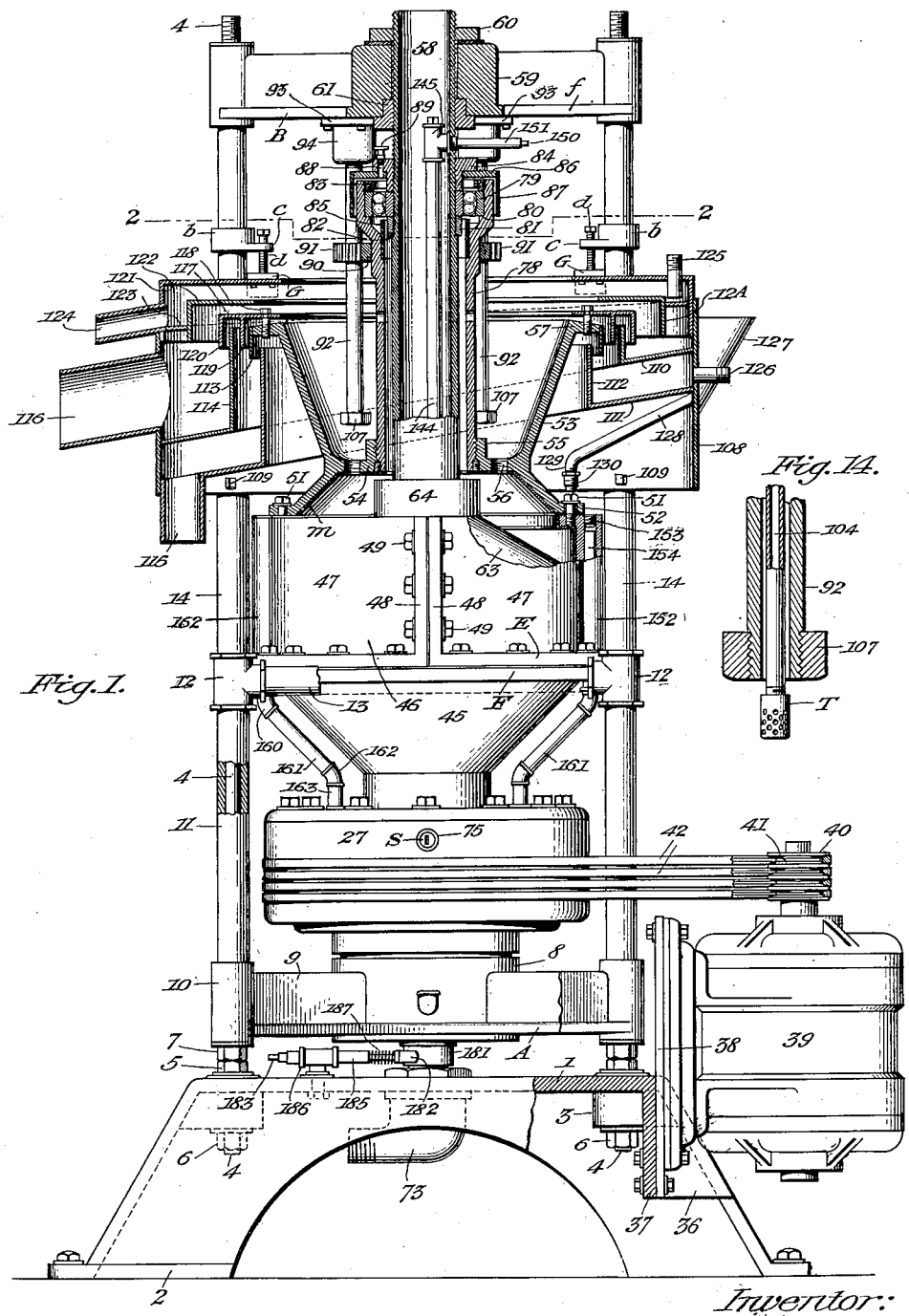
Fig. 1 is a side elevation, partly in section, of the improved apparatus for recovering gold and other values from milled ores and placer material.
Fig. 14 is a view of the lower portion of one of the re-agent supply pipes showing a perforated cap on the end thereof.
Figure 4:
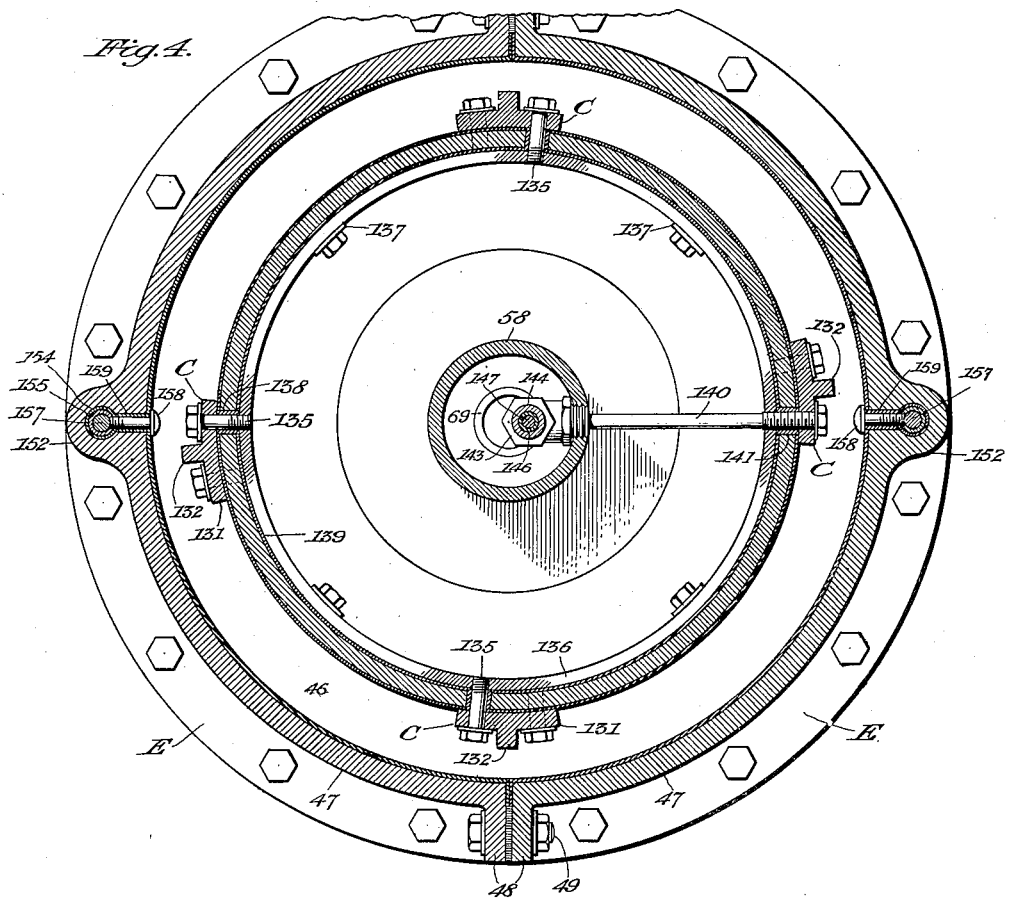
Fig. 4 is a horizontal sectional view on the line 4—4 of Fig. 3.
Figure 5:
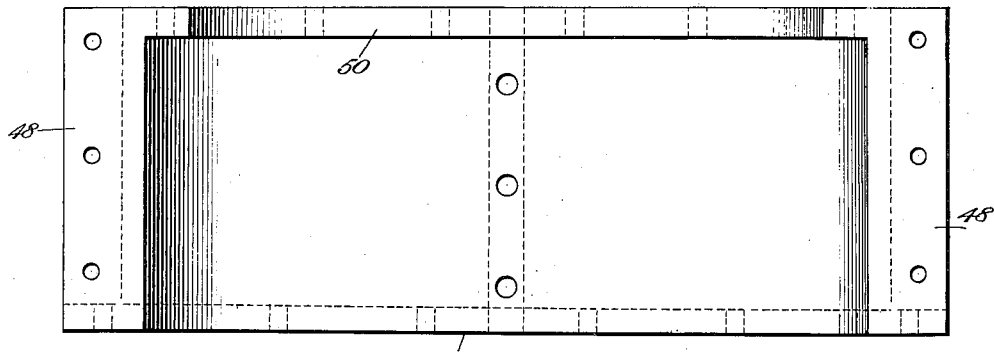
Fig. 5 is a front view of one of the half sections of the amalgamating cylinder, the rubber lining being omitted.

Referring to the accompanying drawings:

The numeral 1 designates the base member of the improved apparatus, which is preferably square in outline and comprises a horizontal plate having depending outwardly inclined side members which terminate in a base flange 2, through which bolts are passed for securing the base to a floor or support. A lug 3 is formed on the under side of the base plate at each corner thereof, and an unthreaded bolt hole extends through each lug and through the plate. Through each one of these bolt holes is inserted the threaded end of a rod 4 of suitable length, and these rods are secured to the lugs by nuts 5 and 6 thereon which are screwed against the upper side of the plate and the under sides of the lugs, as shown in Fig. 1. Nuts 7 are also screwed upon the rods 4 and rest upon the nuts 5. A spider casting A rests upon the four nuts 7, and comprises a central hub 8 from which extend four radial arms 9 having apertured lugs 10 at their outer ends, through which the rods 4 pass and which rest upon the nuts 7. Sections of tubing 11 are slipped over the rods 4 and rest upon the lugs 10 of the spider arms, and side outlet T's 12 are then slipped upon the rods and rest upon the tops of the tubes 11 and are connected by pipes 13, which prevent spreading of the rods 4, and tubes 14 are then slipped over the rods and rest upon the T's 12, and the upper ends of the rods are connected by a spider B, similar to the spider A. The rods 4 extend a short distance above the spider B and short threaded couplers 15 are screwed thereon, and into these couplers are screwed uprights 16, which support a feed hopper 17, which connects with a supply pipe extending into the apparatus, as will be later described.

The hub 8 of the lower spider A is formed with a circular recess 18 in its bottom portion which is counterbored to form a slightly larger recess 19, which is also counterbored to form a slightly larger recess 20, the upper portion of which is threaded, as shown at 21. A ring 22 is seated in the recess 18, the upper face of which is beveled to form a shallow conical seat in which rests the correspondingly beveled lower ring of a ball bearing 23, which takes the down thrust of the rotatable members of the apparatus. The outer ring of a ball bearing 24 rests upon the shoulder formed at the junction of the recesses 19 and 20, and a metal supporting ring 25 is interposed between the inner ring of the ball bearing 24, and the upper ring of the ball bearing 23, and a threaded ring 26, is screwed into the recesses 20 and against the outer ring of the ball bearing 24, thus holding the same against rotative movement.

A chambered cylindrical belt wheel 27 is positioned a short distance above the spider A, and this wheel has an introverted bolt flange 28 on its upper edge and a short hub 29 on its bottom side in which is secured a short depending tubular shaft 30, the upper end portion of which is shouldered to form a reduced portion 31, which fits in a correspondingly reduced hole in the bottom of the wheel. The shaft is held in place by screws 32, which pass through the hub 29 and into openings in the said shaft. The lower portion of the shaft is slightly reduced in diameter to form a shoulder 33, which rests upon the inner ring of the ball bearing 24 and this reduced portion extends tightly through the upper ring of the ball bearing 23 and loosely through the lower ring thereof and to within a slight distance of the bottom of the hub 8. The peripheral face of the wheel 27 is formed with a plurality of annular V-belt grooves 34. One side of the base member is formed with a recess 35 having depending side walls 36 and an end wall 37 at right angles to the base plate 1, and to the end wall 37 is bolted an upright supporting plate 38, to which is bolted an electric motor 39, so that its shaft is vertically disposed, and upon the upper end of the shaft is rigidly mounted a pulley 40 having annular V-belt grooves 41 corresponding to the grooves 34 in the wheel 27, and the pulley and wheel are connected by V-belts 42, by which rotation is communicated from the motor to the said wheel 27, and parts carried thereby.

To the bolt flange 28 of the wheel 27, is secured by bolts 43 a flange 44 on the lower end of a conical bowl 45 which forms the lower half of a concentrating and amalgamating cylinder 46, which comprises two semi-circular sections 47 having registering bolt flanges 48, which are connected by bolts 49. The upper ends of the semi-circular sections terminate in introverted bolt flanges 50, to which is secured by bolts 51 the bolt flange 52 of an agitating and concentrating bowl 53. This bowl has a bottom in the form of a flat ring 54 which is located a short distance above the flange 52, and the wall of the bowl flares or increases in diameter from the bottom to its rim, and from the bottom to the flange 52. The bottom is formed with a central upwardly projecting internally threaded hub 55 and with a circular series of threaded holes 56, for a purpose which will later appear.

The rim of the bowl terminates in an annular flange 57, the upper face of which has a downward slant throughout towards its peripheral edge. The upper threaded portion of a feed pipe 58 extends loosely through the hub 59 of the upper spider B, and is held in suspension by a nut 60 which is threaded to the pipe and rests upon the top of the hub 59 or upon a washer interposed between the nut and hub, as shown in Fig. 1, and the pipe is centered in the hub and held against radial movement by a gland 61, which is threaded to the pipe and fits snugly in a counterbored recess in the under side of the said hub. The feed pipe extends down through the hub 55 of the bowl 53, which hub is of greater diameter than the pipe and terminates within a short distance of the bottom of the conical bowl 45, and has a hollow member 62 mounted thereon which will hereinafter be termed a spacer. The main object of this spacer is to define an annular channel or passage between itself and the wall of the conical bowl and the wall of the amalgamating and concentrating cylinder 46, which is secured upon the upper end of the bowl. To this end, the lower half of the spacer which lies within the bowl is of frusto-conical form to conform to the wall of the bowl, while the upper half, which lies within the cylinder 46 is of cylindrical form. The spacer is closed at the top by a screw cap 63 having a hub 64 through which the feed pipe 58 passes and from which the cap slopes all around at an angle of about thirty degrees. The feed pipe 58 passes through the bottom of the spacer and receives a washer 65 and a clamp nut 66. A abutment ring 67 is secured upon the feed pipe adjoining the hub of the cap 63, by set screws 68, and when the nut 66 is tightened, the spacer is clamped between the washer 65 and the abutment ring 67 and is thus held against movement in any direction upon the feed pipe.

A short nipple 69 is screwed into the lower end of the conical bowl 45, and an ordinary gate valve 70 is screwed thereon, in which is screwed an outlet pipe 71, which extends down through the hollow shaft 30 in the bottom of the chambered belt wheel 27 and loosely through a short nipple 72, in the base plate 1. The pipe 71 is the amalgam outlet pipe, and it may discharge directly into a receptacle placed directly beneath the base plate, or an elbow 73 may be screwed upon the nipple, as shown most clearly in Fig. 7, and a pipe may be screwed upon the elbow to convey the amalgam to any other convenient point of discharge. The valve 70 is located within the belt wheel 27, and is provided with a stem 74 in line with a guide tube 75 secured in a hole in the wall of the wheel, and a key may be inserted through this tube and over the squared end of the valve stem, to open or close the valve.

The feed pipe 58 extends a short distance above the upper spider B and an ordinary gate valve 76 is screwed thereon, and a pipe 77 connects this valve and the discharge end of the feed hopper 17. Thus, a regulated supply of material to be treated is continuously supplied to the conical bowl 45.

The lower end of a pipe 78 is screwed into the hub 55 of the agitator bowl and surrounds the feed pipe 58, which is of considerably less diameter than the pipe 78, so as to leave a relatively wide annular space between them. The pipe extends up to within a short distance of the upper spider B, its upper end portion being of greater diameter than the remainder of the pipe. The outer ring of a ball bearing 79 is seated on a shoulder 80 in the enlarged end of the pipe and the inner ring of this ball bearing is seated upon a ring 81 which rests upon a shoulder 82 of the feed pipe. A ring 83 is screwed into the enlarged end of the pipe 78 and against the outer ball bearing ring, to clamp the same against its seat, and a gland 84, is screwed upon the feed pipe and against the inner ring of the ball bearing to hold the same rigid with respect to the said feed pipe. A sleeve 85 is seated in the pipe 78 beneath the ball bearing, and this sleeve surrounds the feed pipe loosely and extends above the bottom of the enlarged end of the pipe and thus prevents any oil from the ball bearing from entering the space between the two pipes.

A disk 86 is secured to the gland 84 and extends over the end of the pipe 78 and a sleeve or skirt 87 is secured to the marginal edge of the disk and surrounds the end of the said pipe, thus preventing grit or other foreign matter from entering the ball bearing. Oil is admitted to the bearing through a hole 88 which extends through the flange of the gland 84 and through the disk 86, and which is normally closed by a thumbscrew 89.

Holes 78A are formed in the pipe 78 about on a level with the rim of the concentrating bowl 53, to permit the escape of any sludge that may enter the lower end of the said pipe and rise in the space between this pipe and the feed pipe 58.

A gear wheel 90 is rigidly mounted upon the pipe 78 immediately below the enlarged upper end thereof, and this wheel meshes with four small gear wheels 91, which are rigidly mounted on vertical agitator pipes 92 which extend down into the agitator bowl 53 and are supported and arranged in the following manner:

The spider arms are flanged on their bottom sides, as shown at $f$ in Fig. 11, and to the under side of each flange of the upper spider B is bolted a plate 93 having a threaded aperture in each of which is screwed the upper open end of a cup-shaped housing 94, in which are supported upper and lower ball bearings 95 and 96, the outer and inner rings of which are separated by spacing sleeves 97 and 98 respectively, and a sleeve 99 is clamped between the outer ring of the upper bearing and the flange of the spider arm.

The upper end portion of each agitator pipe is slightly reduced in diameter thus forming a shoulder 100 at the junction of the larger and smaller diameters, and this reduced end portion is inserted through an aperture in the bottom of the housing and through the inner bearing rings and their spacing sleeve 98. A sleeve 101 is interposed between the lower inner bearing ring and the shoulder 100 on the pipe, and a sleeve 102 is interposed between the upper inner bearing ring and a clamp nut 103 which is screwed upon the upper end of the pipe, and thus, the inner bearing rings are clamped against the inner spacing sleeve 98 and rotate with the agitator pipes 92. A tube 104 extending loosely through the pipe 92, the clamp nut 103 and through a threaded hole in the flange of the spider arm, and which is locked against movement by jamb nuts 105. A second tube 106 is inserted in a hole in the flange which opens into the housing 94. This latter tube is an air supply tube, and the air therefrom passes into the housing and thence through the space between the agitator pipe 92, and the tube 104, to the agitator bowl where it aerates the concentrates product therein, as will later be more fully set forth. The tube 104 supplies a suitable re-agent to the concentrates product, and this product, under centrifugal action is brought into violent contact with the four rotating agitator pipes 92, and these pipes have nuts 107 screwed upon their lower ends, which produce a violent stirring or churning action, so that the product is thoroughly agitated in the bowl before the final separation of its values by concentration and flotation takes place, and this separation takes place as the material in the agitator bowl overflows therefrom into an improved launder, which is arranged and constructed in the following manner:

A cylindrical housing 108 is supported within the four uprights of the frame of the apparatus, by bolts 109 which are screwed through the housing and into the upright tubes 14, and this housing is on about the same plane as the agitator bowl and about the same depth of this bowl, but of much greater diameter. The housing is provided with two spaced parallel floors 110 and 111, which incline downwardly from one point on the housing wall, to a diametrically opposite point. The bottom floor 111 has a circular opening surrounded by a vertical wall 112 which surrounds the agitator bowl and extends up to within a short distance of its rim flange 57, and this flange is provided with a flat ring or band 113, which extends down slightly below the upper edge of the circular wall 112, but is spaced therefrom. The upper floor 100 is also provided with a circular opening which is surrounded by a vertical wall 114, which is spaced from the wall 112 but slightly higher than the same. An outlet pipe 115 is positioned at the lowest point of the floor 111, and an outlet pipe 116 opens out through the wall of the housing at the lowest point of the upper floor 110.

A flat ring 117 is adjustably secured to the flange 57 of the agitator bowl, by screws 118, by which the ring may be raised or lowered with respect to the said flange so as to vary the space between the flange and the ring, and this flat ring is provided with two depending flat circular bands 119 and 120, the inner band 119 extending down a short distance between the band 113 on the rim flange 57 and the circular wall 114 but spaced from both, and the outer band surrounding rim portion of the wall 114, but spaced therefrom.

A cap 121 in the form of a flat ring has a depending annular band which fits snugly but slidably in the top of the housing 108. A similar flat ring 122 having a depending annular band is supported within the cap but spaced therefrom, and the depending band of this ring is secured in a flat ring 123 which is secured to the band of the cap ring, and this ring 123 forms a floor between the two bands, which inclines downwardly from one point of the cap to a diametrically opposite point, the same as the floors 110 and 111 in the housing 108, and an outlet pipe 124 is secured in the band of the cap at the lowest point of the floor 123. The aperture of the flat ring 117 is of the same diameter as the top of the agitator bowl, but the aperture in the ring 122 is of slightly greater diameter. The functions of the various parts of the improved launder will hereinafter appear.

A wash water pipe 125 extends through the cap ring above the highest point of the floor 123, and a wash water pipe 126 extends through the wall of the housing at the highest point of the floor 111.

A half funnel 127 is secured to the wall of the housing, and a downwardly inclined feed pipe 128 extends from the bottom of the funnel, within the housing, and terminates in a vertical threaded neck 129, upon which is screwed a nipple 130, and when it is desired to supply the bowl 45 with mercury, one of the bolts 51 which secure the flange of the agitator bowl to the amalgamation cylinder is removed, and the nipple 130 on the neck of the feed pipe 128 is screwed down on the said neck and into the hole from which the bolt 51 was removed, thus connecting the pipe 128 with the interior of the amalgamation cylinder and mercury bowl 45, and mercury supplied to the funnel 127, passes through the pipe 128 to the said mercury bowl 45.

The nipple 130 is then unscrewed from the bolt hole in the flange of the agitator bowl and the bolt 51 replaced. The bolt hole into which the nipple is screwed is preferably slightly larger than the other bolt holes in the flange.

The space between the rim of the agitator bowl and the ring 121, permits the concentrates to discharge from the agitator bowl and drop down upon the incline floor 111, whence they pass out through the discharge pipe 115, and the discharge space may be varied by adjusting the screws 118, which support the plate 117, but turn therein. The space between the plates 117 and 122 permits the discharge of the tailings from the agitator bowl, and this space may be increased or diminished in the following manner:

The upper portions of the sleeve 14 which surround the upright rods 4, are slightly reduced in diameter to form shoulders a upon which are seated rings b—see Fig. 12—having laterally projecting ears c provided with threaded apertures which receive screws d the lower end portions of which are grooved to form reduced necks e, which are adapted to enter slots in clips G which are secured to the cap ring 121, the clips comprising vertical plates g which are screwed to the band 117 of the cap, and horizontal plates h which extend on each side of the plates g and are provided with the slots i which receive the neck portions e of the screws d. The slots i open out through the edge of the plate h and by turning the screw supporting rings b the necks of the screws d are moved into the slots and the shoulders j at the lower ends of the necks engage the under sides of the plates h and thus support the cap.

The aperture in the flat ring 122 is slightly larger than the apertures in the rings 117—121, in order to give access to the adjusting screws 118, and the froth on the sludge passes through the ring 122 and into the space between this ring and the ring 121 whence it drops upon the floor 123 and passes out through the pipe 124 for recovery of its values.

The inner face of the bowl 45, the amalgamating cylinder and the part of the agitating bowl 53 below its bottom are lined with a cold process rubber sheeting m which is tough and strong, but highly elastic, and which is also acid proof and capable of resisting abrasion to a high degree. The outside surface of the space 62 is also covered with this rubber m, which also covers the bottom thereof, as well as the abutment collar 67, thus not only protecting the covered surfaces, but insulating them as well.

At four equidistant points on the cylinder wall of the spacer are secured vertically disposed baffle members C, comprising plates 131 having integral projections or baffles 132. The plates are secured by bolts 133 which are insulated from the baffle members by surrounding fibre sleeves 134. But in three of these baffle members, a bolt 135 passes through the wall of the spacer and into a metal ring 136 which is secured to the inner face of the spacer wall by suitable clamp members 137. The bolts 135 are insulated from the spacer wall by surrounding sleeves 138, and the ring is insulated from the spacer by a suitable cover 139 of rubber or other non-conducting material. A long bolt 140 passes through the remaining baffle member and through the wall of the spacer and through the ring 136, but is insulated from the wall of the spacer by a fibre sleeve 141. The inner end of this bolt 140 is screwed into a metal block 142 which is supported in a T-coupling 143 inside the feed pipe 59, and which is screwed into a hole in the wall of the pipe, as shown in Fig. 3, the bolt and the block 142 being insulated from the T-coupling as shown at X. A tube 144 extends up through the feed pipe to a point a short distance below the upper spider B, and is screwed into a T-coupling 145 which is screwed into the wall of the pipe the same as the lower coupler 143. The tube 144 is lined with a non-conducting sleeve 146, and a metal conductor rod 147 is screwed into the metal block 142 at its lower end and at its upper end into a metal block 148 in the T-coupling 145. A metal connection 149 is inserted through the portion of the T-coupling which is screwed into the wall of the feed pipe and has a reduced threaded end which is screwed into the block 148, and the said block as well as the connection 149 are insulated from the T-coupling, as shown at Y. A metal rod 150 is inserted in a socket in the connection 149 and is surrounded by a fibre sleeve 151 and this rod forms the positive terminal of an electric current conducting system for charging the mercury during the amalgamation process. The cooperating part of this current system is arranged as follows:

The two-part amalgamation cylinder is provided with oppositely and vertically disposed enlargements 152 having holes which extend through them from top to bottom, the tops of the holes being closed by screw plugs 153. The holes are lined with non-conducting sleeves 154, in which are inserted metal conducting tubes 155, having short internally threaded metal sleeves 156 driven into their lower ends. Rods 157 having threaded lower ends are passed down through the tubes 155 and screwed into the tubes 156, the upper ends of the rods being squared to receive a suitable wrench. Screws 158 pass through the wall of the concentrating cylinder and through the tubes 155 and engage the rods 157 and these screws are surrounded by fibre sleeves 159 which insulate them from the wall of cylinder, and these screws act as electric current conductors, as will later appear.

The half parts of the amalgamating cylinder are provided on their lower ends with bolt flanges E which are bolted to corresponding flanges F on the mercury bowl 45. Nipples 158 are screwed into holes in the flange F in line with the rods 157 and in these nipples are screwed short threaded tube sections 159 upon which are screwed elbows 160, into which are screwed the upper ends of tubes 161, which lie parallel with the face of the conical bowl 45, and their lower ends receive elbows 162, into which are screwed tube sections 163, which extend down through holes in the base flange 44 of the mercury bowl and into the chambered belt wheel 27. Sleeves of insulating material are inserted in the tubes 163 and 161, and in the elbows 160 and 162, and multiple strand cables 164 having the usual non-conducting wrapper, are passed through these sleeves, and the upper ends of the cables terminate in short threaded pieces 165, which are screwed into short tube sections 166 in the nipples 158, and the lower ends of the rods 157 are also screwed into these sections 166, which thus directly connect the said rods and the cables. By this arrangement, when the concentrating cylinder is bolted to the flange of the mercury bowl, it is only necessary to screw the rods 157 down into the tube sections to make connection with the cables 164, and when it is desired to remove the cylinder from the bowl for any purpose, the screw plugs 153 are removed and the rods 157 are unscrewed from the said tube sections 166.

A pair of elbows 167 having apertured ears 168, are secured to the floor of the hollow belt wheel 27 by screws 169, and vertical fibre tubes 170 are screwed into these elbows and are in line with the tubes 163 and extend to within a slight distance of their lower ends. The lower ends of the cables terminate in short solid sections 171 which are soldered thereto and upon which are secured short metal sleeves 172 into which are screwed plugs 173, the sleeves thus forming a connection between the cables and the plugs, and these plugs fit snugly in metal sleeves 174 which fit tightly in the fibre tubes 170. Fibre tubes 175 are screwed into the other ends of the elbows 167, and cables 176 are passed through these tubes and into the tubes 170, and the upper ends of the cables terminate in solid plugs 177 which are soldered thereto and fit snugly into the lower ends of the metal tubes 174. Thus, in placing the flange of the mercury bowl upon the hollow belt wheel, the plugs 173 are slipped into the metal sleeves 174, thus connecting the cables 164 with the cables 176. The other ends of the cables 176 terminate in solid pieces 178 which are soldered thereto, and which are connected by suitable couplers 179 with short threaded pieces 180 which are screwed into a metal tube 181, which surrounds the mercury outlet pipe, and is insulated both from the said pipe and from the short hollow shaft 30, which is secured in the bottom of the belt wheel 27, as previously described, and through which the pipe 71 passes. The outer face of the lower end portion of the tube 181 is exposed or uninsulated, and is engaged by an arc shaped contact or brush 182 on the end of a rod 183, which is surrounded by a fibre sleeve 184, mounted in a tube 185 which is screwed into a T-casting 186, is bolted to the base plate 1. A coil spring 187 surrounds the sleeve 184 between the end of the tube 185 and the arc shaped contact 182, and is insulated both from the end of the said tube and the contact. This spring insures constant engagement of the contact with the conductor tube 181, and the rod 183, constitutes the negative terminal of the mercury charging electric system.

In operation, a suitable quantity of mercury is supplied to the bowl 45, by means of the funnel 127 and pipe 128, as previously described, and the mercury bowl, the amalgamating cylinder and the agitating and concentrating bowl which are all bolted together, are given a rotary motion of three hundred or more revolutions per minute, whereby the mercury under centrifugal action rises into the amalgamating cylinder and coats the face thereof to a depth of about a quarter of an inch, the upward movement of the mercury being checked by the introverted flange 50 on the top of the bowl.

If ore is to be treated it should be ground to a degree of fineness that will liberate the gold content, of from about 60 to 120 mesh, and if placer sands or gravel is to be treated, it should be passed through a one-eighth inch mesh screen. The pulp or sludge is then fed to the hopper 17, and passes down through the valve 76 and feed pipe 58, to the bowl 45, the supply being regulated by the said valve 76. The sludge is thrown outward under centrifugal action against the inclined wall of the bowl and up the wall and into the space between the wall of the amalgamating cylinder and the spacer 62 and against the mercury coated wall of the cylinder, and the gold, which is the heaviest element, comes in contact with mercury and is caught thereby, and the clean gold amalgamated, while the dusty or coated gold is embedded in the mercury and may later be washed in a dilute solution of nitric acid, and passed through the machine again. The other elements in the sludge automatically arrange themselves in the order of their specific gravities, under the centrifugal action to which they are subjected, and this separation or stratification of the elements is further augmented by the violent contact of the sludge with the baffles 132 on the wall of the said spacer. The sludge from which the gold has been separated by amalgamation, passes up into the agitating and concentrating bowl through the holes 56 in the bottom of said bowl, where it comes into violent contact with the four agitator tubes 92, which extend down nearly to the bottom of the bowl, by which its components are thoroughly separated and the heavier parts or concentrates, are driven against the flared wall of the bowl and climb to its rim, and overflow into the space between the rim flange of the bowl and the flat ring 117, whence it drops down upon the inclined floor 111 of the launder and discharges through the outlet pipe 115. At the same time, a reagent such as pine oil or any other suitable medium is fed into the sludge through the tubes 104, while air is admitted through the pipes 106, the reagent as well as the air being under pressure if desired. The tubes 92 are supported upon the under side of the upper spider B, as previously described, and therefore do not rotate with the bowl, but these tubes are rotated very rapidly in a reverse direction to that of the bowl, by means of the driving gear wheel 90 on the rotatable pipe 78, which meshes with the small gear wheels 91 on the said tubes 92, and the nuts on the lower ends of these tubes produce a violent stirring or agitation of the sludge, causing a thorough mixing or emulsifying of the reagent and the sludge at the lower end of the bowl, and with the introduction of air through the tubes 106 and 92. Myriads of bubbles are formed in the emulsion, which rise to the top of the bowl, carrying with them the finest particles in the sludge, and these bubbles form a froth at the top of the bowl, which overflows into the space between the flat cap rings 121 and 122 and drops down upon the inclined floor 123 and discharges through the outlet pipe 124. The gangue or tailings material overflows into the space between the flat rings 117 and 122, and drops down upon the inclined floor 110, and discharges through the outlet pipe 116. The ring 117 is adjusted with respect to the rim flange 57 of the bowl, by means of the screws 118, so as to define a space just wide enough to permit the concentrates to pass out as they rise to the rim of the bowl, and as they are forcibly discharged from the bowl under centrifugal action, they are driven against the band or shield 119, which diverts them downward to the floor 111. The cap 117 may also be adjusted in the manner before described to provide a discharge outlet of the proper width to permit the proper discharge of the tailings, and the tailings strike against the band or shield 12A which deflects them down upon the floor 110; and as the cap 121 is stationary, while the ring 117 rotates with the bowl, the heavier bottom stratum of the froth will be shaved off by contact with the edge of the opening in the stationary ring 122 and will pass out with the tailings.

The holes 56 in the bottom of the bowl are threaded, and one or more of the holes may be plugged if necessary, so that the discharge from the cylinder may be in proportion to the inflow from the feed pipe 58, and also controls the time element of the sludge in the amalgamating cylinder in coordination with the feed control valve 76.

It will thus be seen that the values in the material passing through the apparatus are recovered by amalgamation, by concentration and by flotation, simultaneously, and that the improved launder is so constructed that the concentrates, the gangue, and the froth overflowing from the bowl, are separated one from the other and pass into separate channels and out through separate outlet pipes and wash water is supplied through the pipes 125 and 126, to insure the discharge of the froth and the concentrates, respectively.

During the operation, the positive and negative terminals 150 and 183, respectively are connected in circuit with an electric current power source, and current passes through the conductor rod 147, block 143 and rod 140 to the metal ring 136, in the interior of the spacer 62 and also through one of the baffle plates C, the other baffle plates being connected to the ring 136, by bolts 135, which with the rod 140 are insulated from the wall of the spacer 62 and conduct the current to the four baffle plates. From the baffle plates the current passes through the sludge to the conductor screws 158 in the wall of the concentrating cylinder and to the rods 157, thence to the cables 164, the lower ends of which connect with the conductor tube 181 through the connections 180 which are screwed into the said tube, the current passing thence to the contact 182 on the end of the rod 183, thus completing the electric circuit. The mercury in the amalgamating cylinder is thus activated by the current which gives it a greater affinity for the gold and also keeps it from flouring. The introduction of electricity also creates a uniformity of water temperatures, thereby making ice-water just as efficient as warmer water in amalgamation.

The flow of current through the machine while running is controlled by a rheostat—not shown—and may be increased or diminished at will.

After the run has been made and the rotatable members cease to rotate, the amalgam in the concentrating cylinder drops down into the mercury bowl 45 and is drawn off therefrom through the outlet pipe 71 by opening the valve 70, which is done by inserting a key through the tube 75 in the wall of the belt wheel and slipping it over the squared end of the valve stem 74 as previously mentioned. The tube 75 may be supplied with a key operated closing plug S, of any common type, to prevent removal of the amalgam from the bowl by an unauthorized person.

The lower ends of the reagent tubes 104 may extend down below the lower ends of their surrounding tubes 92, if desired, and upon these ends may be screwed thimbles T, as shown in Fig. 14, which are closed at their bottom ends but their annular walls are perforated, thus permitting the re-agent to pass out through the said walls, while the closed bottoms of the thimbles prevent the tubes from being stopped up by the sludge as it rushes through the holes 56 in the bottom of the bowl 53.

Having described my invention, what I claim as new and desire to secure by Letters Patent, is:—

1. In apparatus of the character described, a conical mercury bowl, an amalgamating cylinder forming a continuation of said bowl and a concentrating bowl secured together in series, the concentrating bowl having a circular series of holes in its bottom, and means for rotating these members at a high rate of speed; a stationary valved feed pipe extending through them to within a short distance of the bottom of the mercury bowl, a member on the feed pipe having a cylindrical portion concentric with the amalgamating cylinder and spaced therefrom, and a conical part concentric with the mercury bowl and spaced therefrom and baffles on the cylindrical portion, stationary tubes extending down to near the bottom of the concentrating bowl for introducing a re-agent into said bowl, rotatable tubes surrounding the stationary tubes and spaced therefrom for introducing air into the lower end of said bowl, and agitating elements on the lower ends of said tubes, a launder for receiving the overflow from the concentrating bowl and arranged to separate the concentrates, the gangue, and the fines one from the other, and separately discharge them, and a valved outlet pipe in the mercury bowl.

2. Apparatus according to claim 1, in which the bottom of the concentrating bowl is provided with a central hub, a pipe secured in said hub and surrounding the stationary feed pipe but spaced therefrom, and ball bearings interposed between the upper end of said pipe and the feed pipe, a gear wheel surrounding the upper portion of the outer pipe, and small gear wheels on the rotatable air tubes which mesh with said first mentioned gear wheel.

3. In apparatus of the character described, an upright frame; a flared concentrating bowl having a bottom with a circular series of holes and a central aperture; an amalgamating cylinder secured to the flanged lower end of said bowl a conical mercury bowl secured to the lower end of the cylinder and having a flanged base plate; a power driven band wheel secured to said plate having a shaft mounted in the base portion of said frame, a stationary feed pipe mounted in the upper part of said frame and extending down through the connected members and terminating near the lower end of the mercury bowl, a sleeve loosely surrounding said pipe and secured at its lower end in the central hole in the concentrating bowl and a ball bearing between the upper end of the sleeve and the feed pipe, separate means for introducing air and a re-agent at the bottom portion of the concentrating bowl, a member on the feed pipe for defining an annular space between itself and the walls of the amalgamating cylinder and mercury bowl, baffles on said member, and a launder for receiving the overflow from the concentrating bowl and separating the concentrates, the gangue and the froth one from the other and discharging them through separate outlets.

4. Mechanism according to claim 3, in which the band wheel is of hollow cylindrical form, a valved outlet pipe extending from the bottom of the mercury bowl through said wheel, and its shaft, the said valve being within the wheel, and having an operating stem, a tube extending in through the wall of the wheel in line with said stem to permit the insertion of a stem turning key, and means for normally closing the tube.

5. Mechanism according to claim 3, in which the space-defining member is hollow, an interior metal band secured to the wall thereof and insulated therefrom, an insulated electric current conductor extending down through the feed pipe having a positive terminal extending out through the upper portion of the pipe, a rod extending through the pipe from the lower end of said conductor and through the wall of the spacing member and threaded to one of the baffles thereon but insulated from the wall of the spacing member and the pipe, and screw conductors connecting the other baffles with said metal band but insulated from the wall of the spacing member, insulated vertical conductor rods in the wall of the amalgamating cylinder, and screw conductors which pass through the inner face of the cylinder wall and engage said conductor rods but are insulated from the cylinder wall, insulated conductors connected with the lower end of said rods and extending into the hollow wheel, an insulated metal sleeve surrounding the mercury outlet pipe and in current contact with the ends of the conductors which extend into said wheel and a negative terminal contact in engagement with said sleeve, whereby current passes from the positive terminal to the said metal band thence through the baffles and the sludge and through the coat of mercury on the wall of the amalgamating cylinder to the screw conductors and vertical conductor rods, and thence to the said metal sleeve and out through the negative terminal contact, thereby activating the mercury in the amalgamating cylinder.

6. In apparatus of the character described, a hollow power driven wheel having a hollow depending shaft, a conical mercury bowl secured thereon, a valved outlet pipe extending therefrom through said hollow shaft, an amalgamating cylinder secured upon said bowl, a concentrating bowl secured upon said cylinder having a bottom provided with a central hole and a circular series of threaded apertures, a stationary feed pipe extending down through the connected members to near the bottom of the mercury bowl, a hollow member on said pipe for defining an annular space between itself and the walls of the mercury bowl and amalgamating cylinder, baffles on said hollow member, an electric current conductor extending into and down through said pipe, current conducting means in the hollow wheel connecting the lower end of said conductor and the said baffles, conductors in the wall of the amalgamating cylinder and insulated therefrom, a current conducting sleeve surrounding the mercury outlet pipe and insulated therefrom and from said hollow shaft and conductors connecting said sleeve and the conductors in the wall of the amalgamating cylinder, a terminal contact in engagement with the lower end of said sleeve, and a launder for receiving the overflow from the concentrating bowl and separating the concentrates, the gangue, and the froth one from the other.

7. In apparatus of the character described, a mercury bowl, an amalgamating cylinder, and a concentrating bowl connected in series, the mercury bowl having a conical wall and a valved outlet pipe, the amalgamating cylinder having an introverted flange at its upper end, and the concentrating bowl having a wall which tapers for a short distance above its connection with the amalgamating cylinder and then flares toward its upper end and terminates in a rim flange the top of which is downwardly inclined towards its marginal edge, a ring like bottom being formed in the bowl at the junction of the two flared portions which is provided with a circular series of threaded holes, the mercury bowl having a bottom flange and a belt wheel secured thereto, a feed pipe extending down through the members to near the bottom of the mercury bowl, a sleeve loosely surrounding the same and secured at its lower end in the ring like bottom of the concentrating bowl, anti-friction bearings between its upper end and the feed pipe, separate means for introducing air and a re-agent into the lower portion of the concentrating bowl and a launder for receiving the overflow from the concentrating bowl and for separately discharging the concentrates, the gangue and froth carrying the fines.

8. Apparatus according to claim 7, in which the flange rim of the concentrating bowl is provided with adjusting screws and a flat ring supported by said screws and adapted to define with the rim, a space for the discharge of the concentrates from said bowl.

9. In apparatus of the character described, the combination with an amalgamating cylinder, and means for supplying mercury thereto, a concentrating bowl secured thereon and means for rotating them at a high rate of speed, said bowl having a ring like bottom provided with a circular series of holes, from which point it flares toward its connection with the concentrating cylinder and to its rim, a stationary feed pipe extending down through the bowl and cylinder, and a sleeve loosely surrounding said pipe and secured at its lower end in said ring-like bottom, anti-friction means being interposed between the upper end of the sleeve and the feed pipe; of adjustable means on the rim of the bowl for defining a concentrates outlet, and a launder surrounding the bowl having separated annular troughs for receiving and discharging the concentrates, the gangue and the froth carrying the fines, and separate means for admitting air and a re-agent to the bottom of the bowl.

10. In apparatus of the character described, a mercury bowl having a valved outlet pipe, an amalgamating cylinder secured thereon, and having an introverted flange at its upper end, a concentrating bowl on said cylinder having bottom openings communicating with the cylinder and means for rotating them, a stationary feed pipe extending down through the members to near the bottom of the mercury bowl, a hollow member on the feed pipe for defining an annular space between itself and the walls of the mercury bowl and the cylinder, an annular electric current conductor in said hollow spacing member, an insulated conductor in the feed pipe connected at its upper end with a positive terminal and at its lower end with the annular conductor in said hollow member other conductors extending from the annular conductors through the wall of the hollow member, insulated conductor rods in the wall of the cylinder, and conductors connected therewith and extending through the inner face of the cylinder wall, a metal sleeve surrounding the said outlet pipe and movable therewith but insulated therefrom, conductors connecting the rods in the cylinder wall with said metal sleeve, and a terminal contact in engagement with said metal sleeve.

11. In apparatus of the character described, a mercury bowl, an amalgamating cylinder and a concentrating bowl connected together one above the other, and means for rotating them, means for supplying sludge to the mercury bowl, stationary tubes extending down into the concentrating bowl for supplying a reagent to the sludge, rotatable air admitting tubes surrounding the first mentioned tubes and agitating means thereon, a launder for receiving the overflow from the concentrating bowl and arranged to separate the concentrates, the gangue and the fines one from the other, and a valved outlet pipe for draining the mercury bowl.

12. In apparatus of the character described, the combination with a flared rotatable concentrating bowl having openings in its bottom and a flanged rim; of a flat ring adjustably secured to said rim and defining a concentrates outlet, a launder surrounding said bowl and spaced therefrom, a cap adjustably mounted in the top of the launder and comprising spaced flat rings having depending rim bands, the space between the inner ring and the ring on the bowl flange constituting a gangue outlet passage, and the space between the inner and outer cap rings constituting an outlet for the froth carrying the fines, an annular trough in the cap to receive and discharge the fines, annular troughs in the launder for receiving and discharging the gangue and concentrates, and means for delivering sludge to the bowl through the openings in the bottom thereof.

13. In apparatus of the character described, the combination with a rotatable mercury bowl having a valved outlet pipe, and an amalgamation cylinder secured thereon and forming a continuation of the bowl; of a stationary feed pipe extending down into said bowl, a hollow member secured to said pipe and spaced from the amalgamation cylinder, baffles on said hollow member, a flat metal ring secured upon the inner face of the hollow member but insulated therefrom, an electric current conductor extending down through said pipe and connected with said flat ring, and conductors in the form of screws connecting said baffles and said ring, current conductors in the wall of the cylinder, having terminal connections, a concentrating bowl secured upon the amalgamation cylinder, and means for receiving the overflow from the concentrating bowl and separating the values according to their specific gravities.

14. In apparatus of the character described, the combination with a frame a mercury bowl, an amalgamation cylinder bolted thereon and having an introverted flange on its upper end, a concentrating bowl having a base flange which is bolted to the said introverted flange; and means for rotating the parts; of means for supplying mercury to the mercury bowl comprising a funnel-like member secured to a fixed member on the frame, a pipe extending from said funnel-like member having a sleeve threaded upon its end, said sleeve being adapted to be screwed down until it enters one of the bolt holes in the flange of the concentrating bowl upon removal of the bolt therein which connects said flange with the introverted flange of the amalgamating cylinder, thereby connecting the end of the pipe with the interior of said cylinder.

15. In apparatus of the character described, an upright frame, a mercury bowl, an amalgamating cylinder and a concentrating bowl secured together one above the other and rotatably mounted in said frame, a flat ring adjustably mounted on the rim of the concentrating bowl to form therewith a concentrates outlet, a launder surrounding said bowl and a cap adjustably mounted in said launder having an outlet for the froth and forming with the said flat ring an outlet for the gangue, said cap acting to receive and discharge the froth, and said launder acting to separately receive and discharge the concentrates and gangue.

16. Apparatus according to claim 15, in which slotted clips are secured upon the circumferential edge portion of said cap, brackets secured upon the frame, and vertically disposed screws mounted in said brackets having reduced neck portions adjacent their ends which enter the slots in said clips, whereby adjustment of the screws causes a corresponding adjustment of the said cap.

FRANK D. LEWIS.